US012811631B2

(12) United States Patent
Ibrahim et al.

(10) Patent No.: US 12,811,631 B2
(45) Date of Patent: Nov. 24, 2026

(54) PARTIAL SOUNDING FOR LINE OF SIGHT MULTIPLE INPUT MULTIPLE OUTPUT MULTIPLEXING

(71) Applicant: QUALCOMM Incorporated, San Diego, CA (US)

(72) Inventors: Abdelrahman Mohamed Ahmed Mohamed Ibrahim, San Diego, CA (US); Renqiu Wang, San Diego, CA (US); Muhammad Sayed Khairy Abdelghaffar, San Jose, CA (US); Yu Zhang, San Diego, CA (US); Naga Bhushan, San Diego, CA (US); Pinar Sen, San Diego, CA (US); Seyong Park, San Diego, CA (US); Krishna Kiran Mukkavilli, San Diego, CA (US); Tingfang Ji, San Diego, CA (US); Peter Gaal, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 168 days.

(21) Appl. No.: 18/562,226

(22) PCT Filed: May 26, 2021

(86) PCT No.: PCT/CN2021/095957

§ 371 (c)(1),
(2) Date: Nov. 17, 2023

(87) PCT Pub. No.: WO2022/246676

PCT Pub. Date: Dec. 1, 2022

(65) Prior Publication Data

US 2024/0243782 A1 Jul. 18, 2024

(51) Int. Cl.

*H04B 7/0413* (2017.01)
*H04B 7/06* (2006.01)

(52) U.S. Cl.

CPC ....... *H04B 7/0413* (2013.01); *H04B 7/06966* (2023.05)

(58) Field of Classification Search

CPC .. H04B 7/0413; H04B 7/088; H04B 7/06966; H04B 7/0628; H04B 7/0691

See application file for complete search history.

(56) References Cited

U.S. PATENT DOCUMENTS 12,531,609 B2 * 1/2026 Go .......................... H04B 7/061
2016/0315683 A1 * 10/2016 Liu ...................... H04B 7/0602

(Continued)

FOREIGN PATENT DOCUMENTS

CN 104937853 A 9/2015
CN 109565370 A 4/2019

(Continued)

OTHER PUBLICATIONS

International Search Report and Written Opinion—PCT/CN2021/095957—ISA/EPO—Feb. 8, 2022.

(Continued)

*Primary Examiner* — Wayne H Cai
(74) *Attorney, Agent, or Firm* — Harrity & Harrity, LLP

(57) ABSTRACT

Various aspects of the present disclosure generally relate to wireless communication. In some aspects, a receiving device may transmit, to a transmitting device, a line of sight (LOS) multiple input multiple output (MIMO) channel sounding configuration that indicates one or more channel sounding parameters for a partial sounding procedure associated with an LOS MIMO channel. The receiving device may receive, from the transmitting device, at least one sounding reference signal (SRS) based at least in part on the one or more channel sounding parameters. Numerous other aspects are described.

32 Claims, 12 Drawing Sheets

(56) References Cited

U.S. PATENT DOCUMENTS

| | | | | |
|---|---|---|---|---|
| 2017/0214518 | A1* | 7/2017 | Oh | H04L 25/03012 |
| 2018/0152325 | A1 | 5/2018 | Frank et al. | |
| 2019/0068260 | A1* | 2/2019 | Yan | H04B 7/0404 |
| 2020/0195315 | A1 | 6/2020 | Wang et al. | |
| 2020/0313815 | A1 | 10/2020 | Sridharan et al. | |
| 2020/0322119 | A1* | 10/2020 | Matsumura | H04L 5/0037 |
| 2021/0126749 | A1 | 4/2021 | Iyer et al. | |
| 2021/0135812 | A1 | 5/2021 | Sridharan et al. | |
| 2022/0271806 | A1* | 8/2022 | Zhu | H04B 7/0456 |
| 2022/0357420 | A1* | 11/2022 | Zhou | G01S 5/10 |

FOREIGN PATENT DOCUMENTS

| | | | |
|---|---|---|---|
| CN | 111819892 | A | 10/2020 |
| WO | WO-2021019290 | A1 | 2/2021 |
| WO | 2021093591 | A1 | 5/2021 |

OTHER PUBLICATIONS

Supplementary Partial European Search Report—EP21942259—Search Authority—Munich—Jan. 16, 2025.

Supplementary European Search Report—EP21942259—Search Authority—Munich—Apr. 7, 2025.

* cited by examiner

600

605

PARTIAL SOUNDING FOR LINE OF SIGHT MULTIPLE INPUT MULTIPLE OUTPUT MULTIPLEXING

CROSS-REFERENCE TO RELATED APPLICATION

This Patent Application is a 371 national stage of PCT Application No. PCT/CN2021/095957 filed on May 26, 2021, entitled "PARTIAL SOUNDING FOR LINE OF SIGHT MULTIPLE INPUT MULTIPLE OUTPUT MULTIPLEXING," and assigned to the assignee hereof. The disclosure of the prior Application is considered part of and is incorporated by reference into this Patent Application in its entirety.

FIELD OF THE DISCLOSURE

Aspects of the present disclosure generally relate to wireless communication and to techniques and apparatuses for partial sounding for line of sight multiple input multiple output multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a receiving device for wireless communication includes a memory; and one or more processors, coupled to the memory, configured to: transmit, to a transmitting device, a line of sight (LOS) multiple input multiple output (MIMO) channel sounding configuration that indicates one or more channel sounding parameters for a partial sounding procedure associated with an LOS MIMO channel; and receive, from the transmitting device, at least one sounding reference signal (SRS) based at least in part on the one or more channel sounding parameters.

In some aspects, a transmitting device for wireless communication includes a memory; and one or more processors, coupled to the memory, configured to: receive, from a receiving device, an LOS MIMO channel sounding configuration that indicates one or more channel sounding parameters for a partial sounding procedure associated with an LOS MIMO channel; and transmit, to the receiving device, at least one SRS based at least in part on the one or more channel sounding parameters.

In some aspects, a method of wireless communication performed by a receiving device includes transmitting, to a transmitting device, an LOS MIMO channel sounding configuration that indicates one or more channel sounding parameters for a partial sounding procedure associated with an LOS MIMO channel; and receiving, from the transmitting device, at least one SRS based at least in part on the one or more channel sounding parameters.

In some aspects, a method of wireless communication performed by a transmitting device includes receiving, from a receiving device, a LOS MIMO channel sounding configuration that indicates one or more channel sounding parameters for a partial sounding procedure associated with an LOS MIMO channel; and transmitting, to the receiving device, at least one SRS based at least in part on the one or more channel sounding parameters.

In some aspects, a non-transitory computer-readable medium storing a set of instructions for wireless communication includes one or more instructions that, when executed by one or more processors of a receiving device, cause the receiving device to: transmit, to a transmitting device, an LOS MIMO channel sounding configuration that indicates one or more channel sounding parameters for a partial sounding procedure associated with an LOS MIMO channel; and receive, from the transmitting device, at least one SRS based at least in part on the one or more channel sounding parameters.

In some aspects, a non-transitory computer-readable medium storing a set of instructions for wireless communication includes one or more instructions that, when executed by one or more processors of a transmitting device, cause the transmitting device to: receive, from a receiving device, an LOS MIMO channel sounding configuration that indicates one or more channel sounding parameters for a partial sounding procedure associated with an LOS MIMO channel; and transmit, to the receiving device, at least one SRS based at least in part on the one or more channel sounding parameters.

In some aspects, an apparatus for wireless communication includes means for transmitting, to a transmitting device, an LOS MIMO channel sounding configuration that indicates one or more channel sounding parameters for a partial sounding procedure associated with an LOS MIMO channel; and means for receiving, from the transmitting device, at least one SRS based at least in part on the one or more channel sounding parameters.

In some aspects, an apparatus for wireless communication includes means for receiving, from a receiving device, an LOS MIMO channel sounding configuration that indicates one or more channel sounding parameters for a partial sounding procedure associated with an LOS MIMO channel; and means for transmitting, to the receiving device, at least one SRS based at least in part on the one or more channel sounding parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
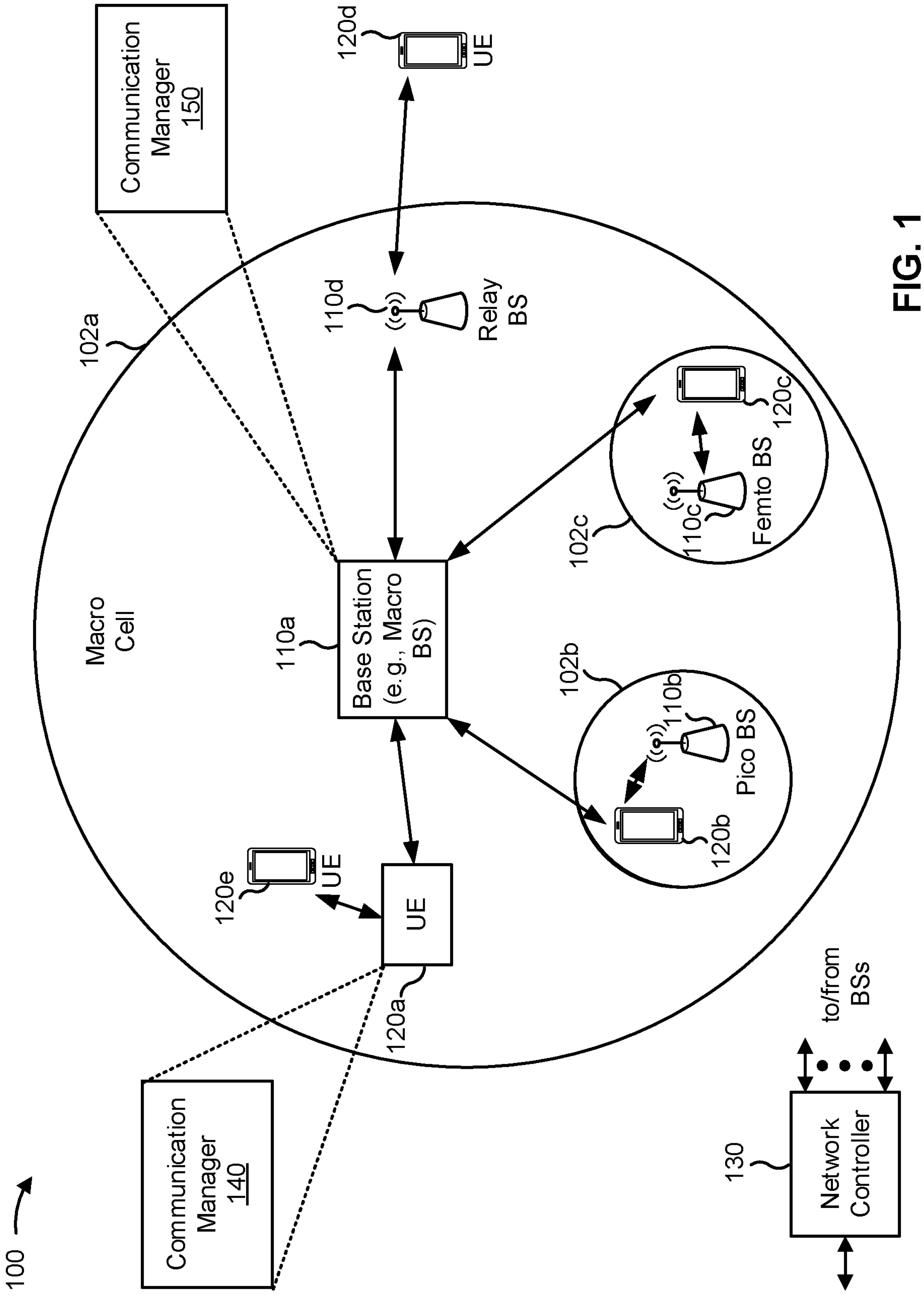
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 (e.g., a transmitting device) may include a communication manager 140. As described in more detail elsewhere herein, the communication manager 140 may receive, from a receiving device (e.g., a base station), a line of sight (LOS) multiple input multiple output (MIMO) channel sounding configuration that indicates one or more channel sounding parameters for a partial sounding procedure associated with an LOS MIMO channel; and transmit, to the receiving device, at least one sounding reference signal (SRS) based at least in part on the one or more channel sounding parameters. Additionally, or alternatively, the communication manager 140 may perform one or more other operations described herein.

In some aspects, the base station 110 (e.g., a receiving device) may include a communication manager 150. As described in more detail elsewhere herein, the communication manager 150 may transmit, to a transmitting device, an LOS MIMO channel sounding configuration that indicates one or more channel sounding parameters for a partial sounding procedure associated with an LOS MIMO channel; and receive, from the transmitting device, at least one SRS based at least in part on the one or more channel sounding parameters. Additionally, or alternatively, the communication manager 150 may perform one or more other operations described herein.

As indicated above, FIG. 1 is provided as an example. Other examples may differ from what is described with regard to FIG. 1.

Figure 2:
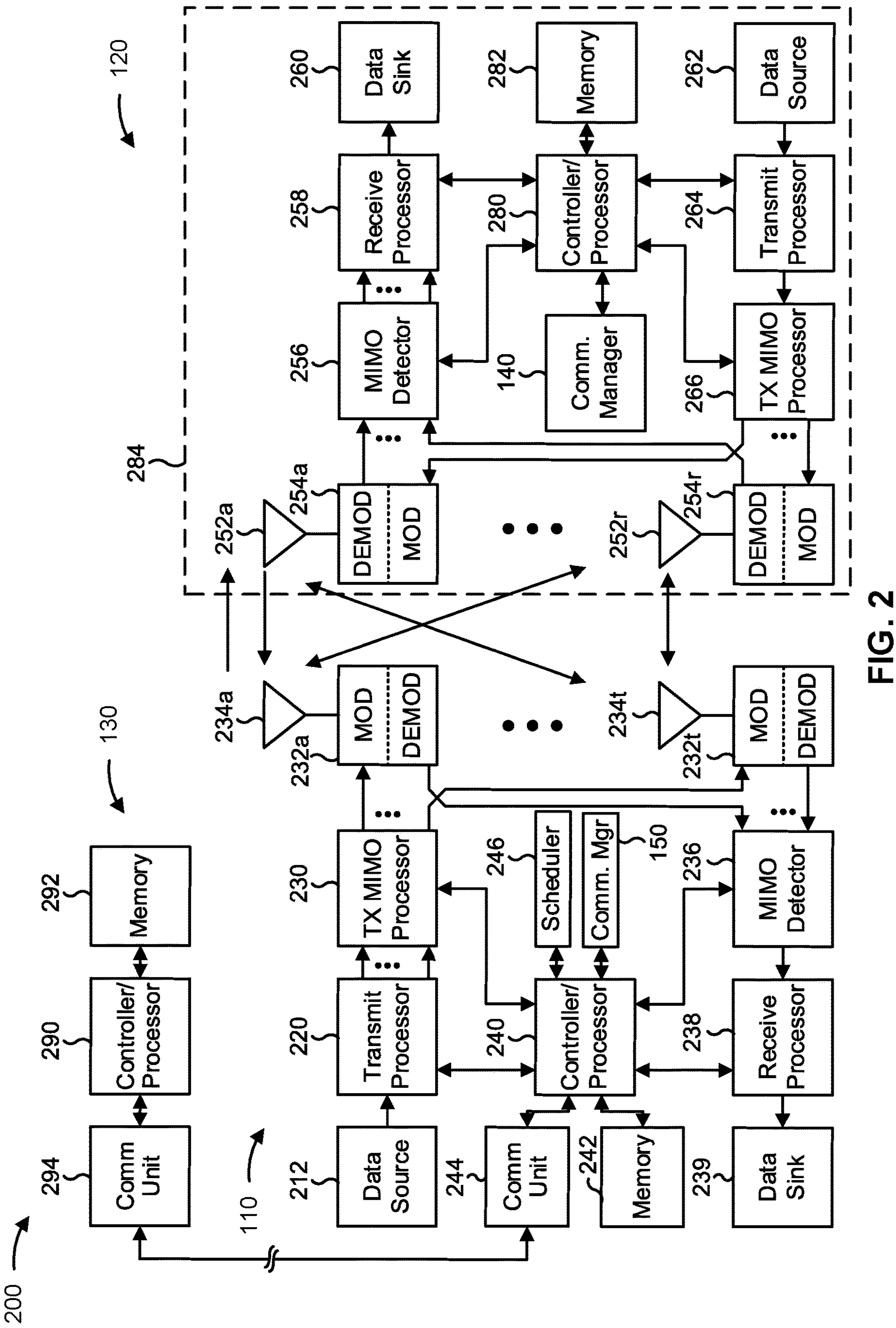
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general $T\geq 1$ and $R\geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4, 5A, 5B, 6A, 6B, and 7-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4, 5A, 5B, 6A, 6B, and 7-9.

Controller/processor 240 of base station 110, controller/processor 280 of UE 120, and/or any other component(s) of FIG. 2 may perform one or more techniques associated with partial sounding for LOS MIMO multiplexing, as described in more detail elsewhere herein. In some aspects, the receiving device described herein is the base station 110, is included in the base station 110, or includes one or more components of the base station 110 shown in FIG. 2. In some aspects, the transmitting device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the receiving device includes means for transmitting, to a transmitting device, an LOS MIMO channel sounding configuration that indicates one or more channel sounding parameters for a partial sounding procedure associated with an LOS MIMO channel; and/or means for receiving, from the transmitting device, at least one SRS based at least in part on the one or more channel sounding parameters. In some aspects, the means for the receiving device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the transmitting device includes means for receiving, from a receiving device, an LOS MIMO channel sounding configuration that indicates one or more channel sounding parameters for a partial sounding procedure associated with an LOS MIMO channel; and/or means for transmitting, to the receiving device, at least one SRS based at least in part on the one or more channel sounding parameters. In some aspects, the means for the transmitting device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
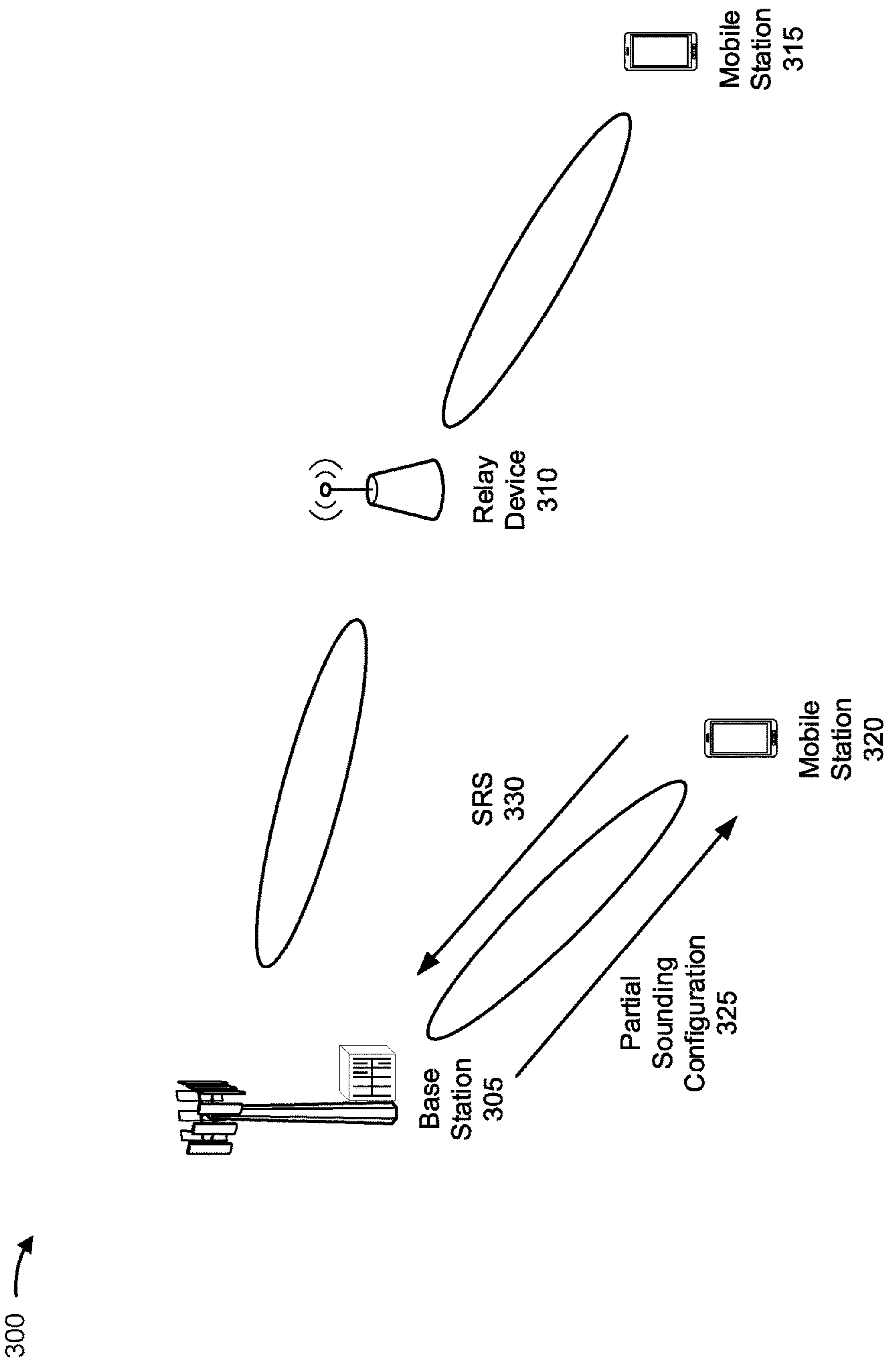
FIG. 3 is a diagram illustrating an example of line of sight (LOS) multiple input multiple output (MIMO) multiplexing, in accordance with the present disclosure.

FIG. 3 is a diagram illustrating an example of LOS MIMO multiplexing, in accordance with the present disclosure. As shown in FIG. 3, a base station 305 may communicate with a relay device 310, which may communicate with a mobile station 315 (e.g., a UE). The base station 305 may communicate with a mobile station 320 directly.

LOS MIMO multiplexing can provide high multiplexing gain in some circumstances. For example, LOS MIMO can provide high multiplexing gain when a distance between a transmission array and a reception array does not exceed a certain threshold that can depend on apertures of the transmission and reception arrays and/or carrier frequency, among other examples. LOS MIMO can provide high multiplexing gain when an accurate LOS MIMO precoder is used and/or when the transmitting device has channel knowledge, can determine distance feedback, and/or can compensate for transmitter-receiver misalignment.

For example, in some cases, LOS MIMO may be used in a backhaul link between the base station 305 and the relay device 310 (e.g., an IAB node and/or a smart repeater, among other examples). In some cases, LOS MIMO may be used in an access link between the base station 305 and the mobile station 320 and/or between the relay device 310 and the mobile station 315.

LOS MIMO multiplexing can be exploited in improving the system spectral efficiency if accurate precoding may be performed. For dynamic scenarios, the LOS MIMO channel can change because of mobility and/or misalignment, among other examples. To obtain an accurate precoder at the base station (or relay device), full channel sounding may be used. However, full channel sounding can incur high spatial sounding overhead, thereby having a negative impact on network performance.

Some aspects of techniques and apparatuses described herein may facilitate use of a precoder design that can exploit LOS MIMO multiplexing gain based on partial sounding, which is a reference signal sounding procedure during which only a subset of a transmitting device's antennas is sounded. As the term is used herein, a "transmitting device" is a device that transmits an SRS for a partial sounding procedure. A "receiving device" is a device that receives an SRS for a partial sounding procedure. In some aspects, the receiving device may provide a partial sounding configuration to the transmitting device (e.g., as shown by reference number 325), which may transmit at least one SRS using a subset of its antennas (e.g., as shown by reference number 330). The receiving device may estimate the LOS MIMO channel based at least in part on the at least one SRS. In this way, some aspects may facilitate a partial sounding procedure that may enable accurate precoding without the overhead of full sounding, thereby having a positive impact on network performance.

As indicated above, FIG. 3 is provided as an example. Other examples may differ from what is described with respect to FIG. 3.

Figure 4:
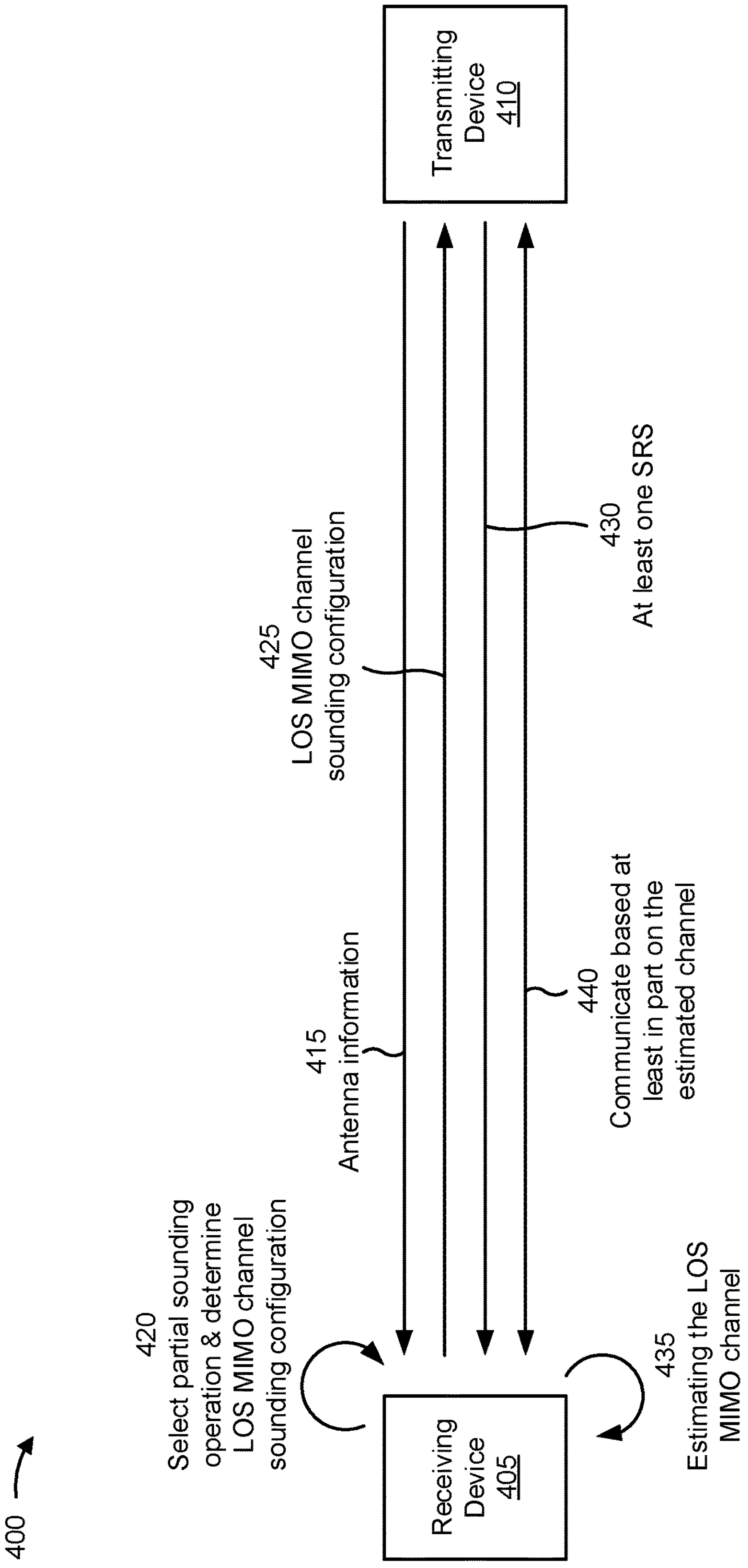
FIG. 4 is a diagram illustrating an example associated with partial sounding for LOS MIMO multiplexing, in accordance with the present disclosure.
Figure 5A:
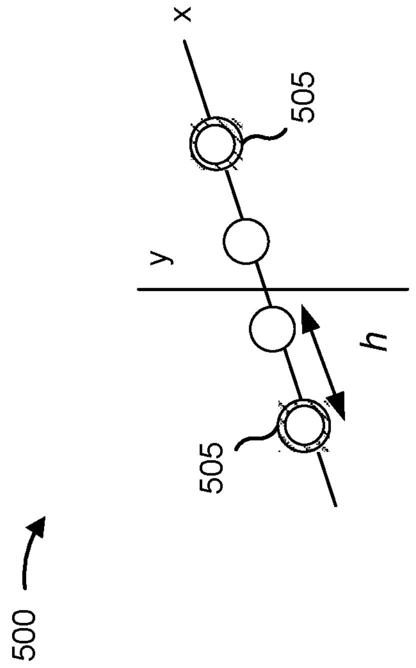
FIGS. 5A, 5B, 6A, and 6B are diagrams illustrating examples associated with performing a phase ramp procedure for channel estimation in LOS MIMO, in accordance with the present disclosure.
Figure 5B:
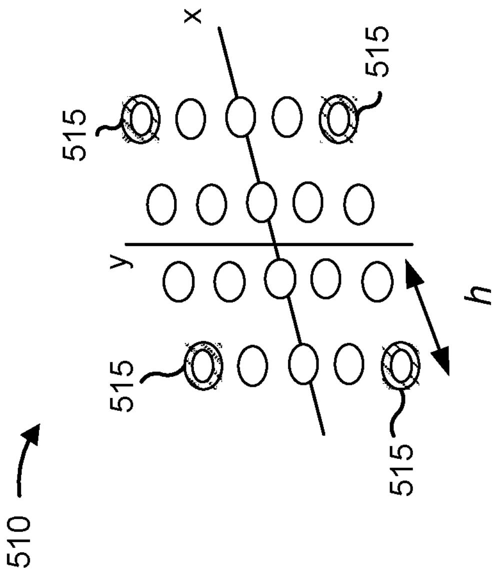

FIG. 4 is a diagram illustrating an example associated with partial sounding for LOS MIMO multiplexing, in accordance with the present disclosure. As shown, a receiving device 405 and a transmitting device 410 may communicate with one another.

As shown by reference number 415, the transmitting device 410 may transmit, and the receiving device 405 may receive, antenna information. In some aspects, the antenna information may indicate at least one of a mapping between one or more antenna ports and one or more corresponding locations within an antenna array of the transmitting device, LOS MIMO capability information, LOS MIMO sounding capability information, alignment capability information, an antenna array geometry, a number of antennas, a number of antenna panels, an antenna element distance matrix, polarization information, or user equipment-assisted information (UAI). In some aspects, the mapping may include a bitmap (e.g., a 2D bitmap to indicate antenna port to location mapping). In some aspects, the UAI may indicates at least one of: a phase response associated with an antenna port, a phase difference between a first antenna port and a second antenna port, phase coherence between the first antenna port and the post antenna port, or antenna blockage information.

As shown by reference number 420, the receiving device 405 may select a partial sounding operation and determine an LOS MIMO channel sounding configuration. For example, the receiving device 405 may select the partial sounding operation as opposed to a full sounding operation. In some aspects, the receiving device 405 may select the partial sounding procedure based at least in part on at least one of an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

In some aspects, the one or more channel sound parameters may indicate at least one of a subset of antennas of the transmitting device to be used for the partial sounding procedure or a sounding bandwidth. The receiving device 405 may determine the sounding bandwidth based at least in part on at least one of an estimated LOS MIMO percentage corresponding to a communication channel and/or a number of reception antennas of the receiving device, among other examples.

In some aspects, the LOS MIMO channel sounding configuration may indicate an antenna configuration. For example, the antenna configuration may indicate a number of sounding antennas to be used and may identify the sounding antennas. In some aspects, the receiving device 405 may determine the antenna configuration based at least in part on at least one of an LOS MIMO sounding capability of the transmitting device, an estimated LOS MIMO percentage corresponding to a communication channel, or an antenna array geometry of the transmitting device. In some aspects, the LOS MIMO channel sounding configuration may include an SRS configuration. The SRS configuration may indicate one or more SRS resource sets, wherein each SRS resource set of the one or more SRS resource sets comprises a first parameter configuration corresponding to regular MIMO operation and a second parameter configuration for LOS MIMO operation. The receiving device 405 may transmit an LOS mode activation indication that indicates the first parameter configuration or the second parameter configuration.

In some aspects, the LOS MIMO channel sounding configuration comprises a mapping between at least one sounding antenna index and at least one corner antenna. The LOS MIMO channel sounding configuration may indicate one or more SRS indices associated with the partial sounding procedure. In some aspects, a wireless communication standard may indicate a mapping between the one or more SRS indices and one or more antennas corresponding to an antenna configuration of the transmitting device.

As shown by reference number 425, the receiving device 405 may transmit, and the transmitting device 410 may receive, the LOS MIMO channel sounding configuration. As shown by reference number 430, the transmitting device 410 may transmit, and the receiving device 405 may receive, at least one SRS. In some aspects, the at least one SRS may be based at least in part on the one or more channel sounding parameters.

As shown by reference number 435, the receiving device 405 may estimate the LOS MIMO channel based at least in part on applying an interpolation to the at least one SRS. In some aspects, the interpolation comprises a linear interpolation over a plurality of channel estimates associated with the at least one SRS. In some aspects, applying the interpolation comprises performing a phase ramp procedure to determine a phase interpolation. The receiving device 405 may perform the phase ramp procedure by determining a phase difference between at least two antennas and estimating at least one phase of at least one additional antenna based at least in part on at least one of: the phase difference, a transmission antenna configuration, or a reception configuration. In some aspects, for example, the at least two antennas comprise at least two corner antennas, and estimating the at least one phase of the at least one additional antenna comprises determining a linear phase ramp associated with the at least two corner antennas.

The structure of a rectangular array may be utilized in estimating the LOS MIMO channel. Most of the channel information is in the channel phase for a large enough distance. The phase difference between corner antennas may be approximated with a line (the phase ramp), which may be used to estimate the phase of the remaining antennas based at least in part on an observation that the ratios between antenna phase differences are almost constant with distance and misalignment.

As shown by reference number 440, the receiving device 405 and the transmitting device 410 may communicate based at least in part on the estimated channel.

As indicated above, FIG. 4 is provided as an example. Other examples may differ from what is described with respect to FIG. 4.

FIGS. 5A, 5B, 6A, and 6B are diagrams illustrating examples associated with performing a phase ramp procedure for channel estimation in LOS MIMO, in accordance with the present disclosure.

In a phase ramp procedure according to the present disclosure, a receiving device may configure a transmitting device to sound edge antennas. The number of antennas to be sounded may depend on the geometry of the antenna panel. For example, as shown by reference number 500 in FIG. 5A, the transmitting device may sound two edge antennas 505, and the receiving device may determine an estimated channel, h, across the antennas disposed between the edge antennas 505. As shown by reference number 510 in FIG. 5B, the transmitting device may sound four corner antennas 515 in a two-dimensional (2D) grid, and the receiving device may determine an estimated channel, h, across the remaining antennas.

Figure 6A:
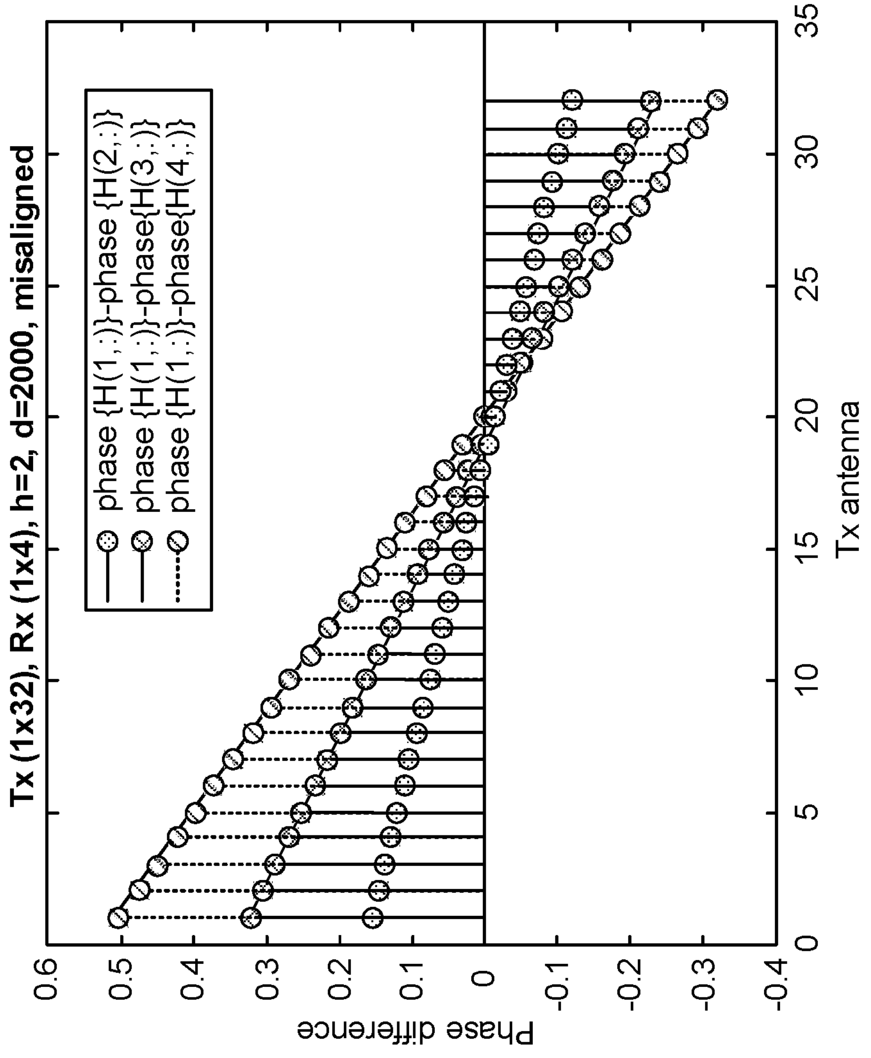
Figure 6B:
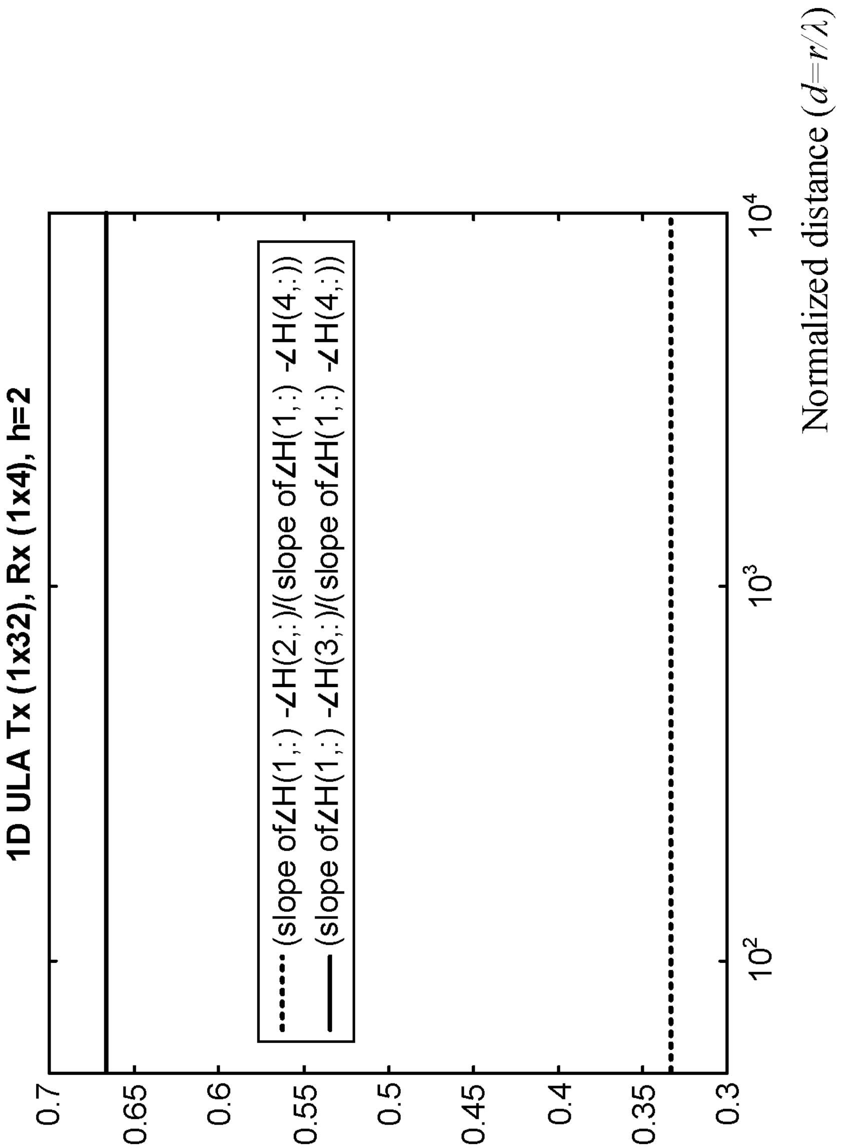

As shown in FIG. 6A, the phase difference between corner antennas (ant1 and ant4) may be approximated with a line (the phase ramp shown in FIG. 6B). The slope, slp14, of this line may be used to estimate the slope of Phase{H(1,:)}−Phase{H(2,:)}=(⅓)*slp14 and the slope of Phase{H(1,:)}−Phase{H(3,:)}=(⅔)*slp14.

As indicated above, FIGS. 5A, 5B, 6A, and 6B are provided as an example. Other examples may differ from what is described with respect to FIGS. 5A, 5B, 6A, and 6B.

Figure 7:
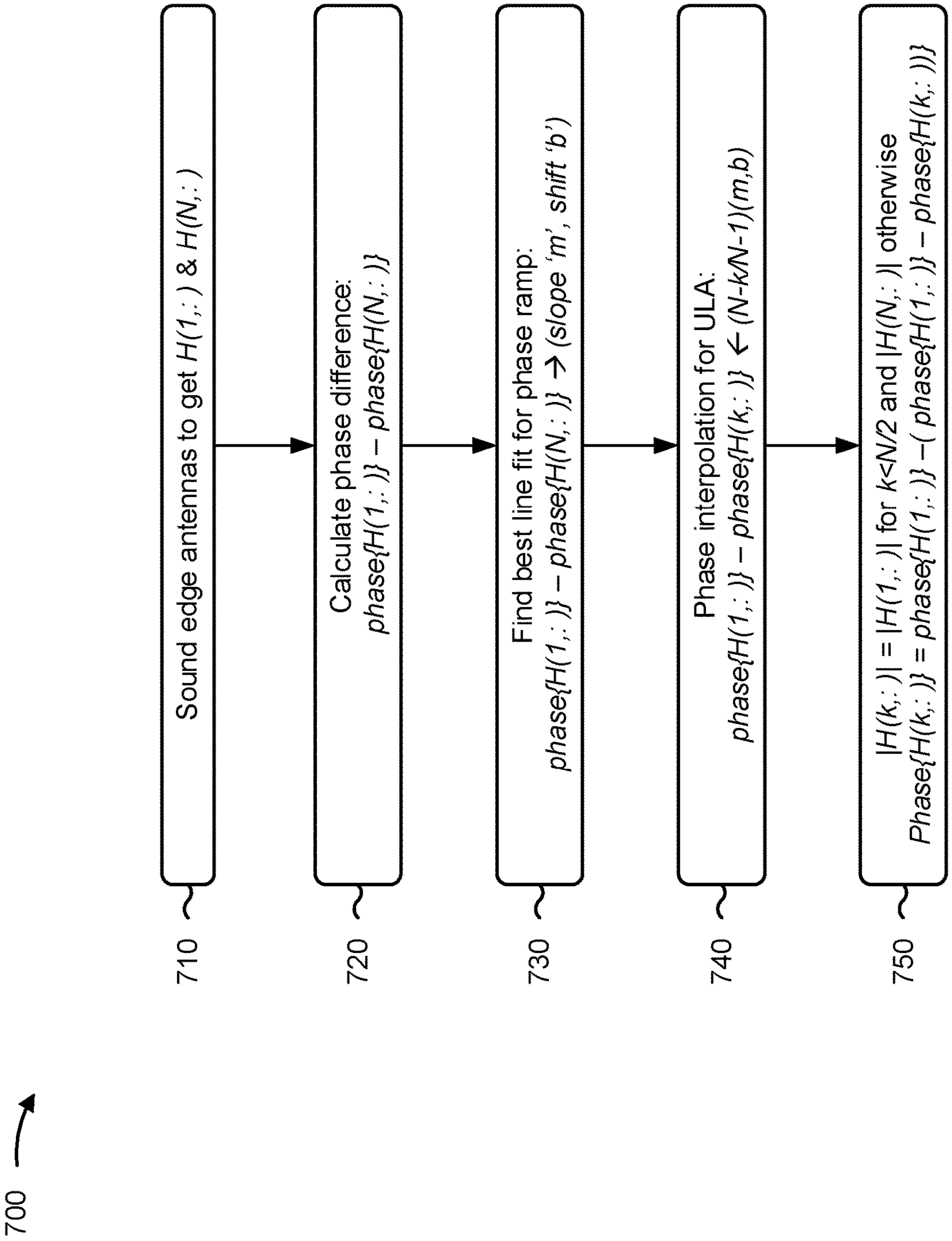
FIG. 7 is a diagram illustrating an example process associated with performing a phase ramp procedure for channel estimation in LOS MIMO, in accordance with the present disclosure.

FIG. 7 is a diagram illustrating an example process 700 associated with performing a phase ramp procedure for channel estimation in LOS MIMO, in accordance with the present disclosure. For example, as shown by reference number 710, the procedure may include sounding the edge antennas to obtain H(1,:) & H(N,:). As shown by reference number 720, the procedure includes calculating the phase difference: phase{H(1,:)}−phase{H(N,:)}. As shown by reference number 730, the receiving device may find a best line fit for the phase ramp: phase{H(1,:)}−phase{H(N,:)}→(slope 'm', shift 'b'). As shown by reference number 740, the receiving device may determine a phase interpolation for a uniform linear array (ULA):

$$\text{phase}\{H(1,\ :)\} - \text{phase}\{H(k,\ :)\} \leftarrow \left(\frac{N-k}{N-1}\right)(m,\ b).$$

As shown by reference number 750, the interpolation may result in determining: |H(k,:)|=|H(1,:)| for k<N/2 and |H(N,:)| otherwise, and Phase{H(k,:)}=phase{H(1,:)}−(phase{H(1,:)}−phase{H (k,:)}). The scaling factor $$\left(\frac{N-k}{N-1}\right)$$

may be for ULA. Interpolation associated with linear arrays with non-uniform spacing may use different scaling factors.

As indicated above, FIG. 7 is provided as an example. Other examples may differ from what is described with respect to FIG. 7.

Figure 8:
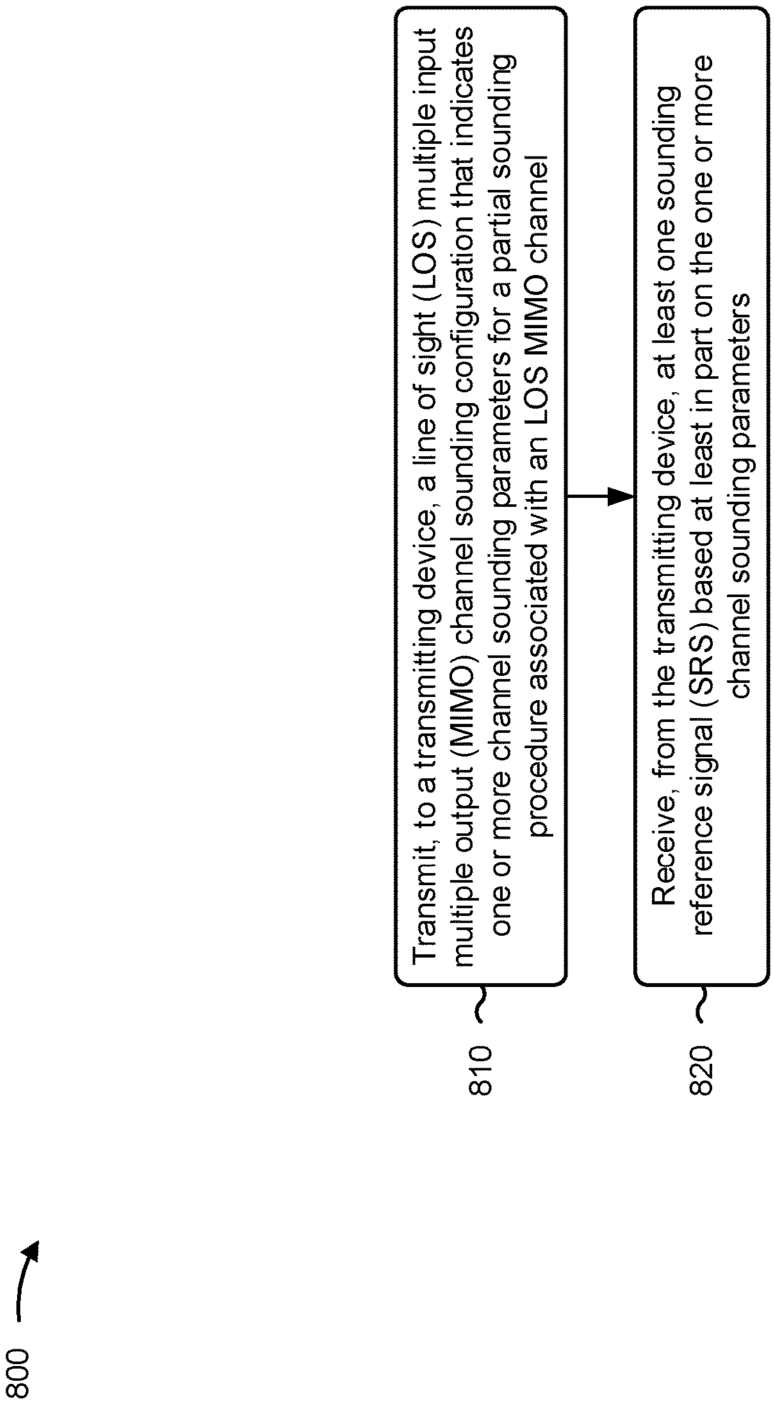
FIGS. 8 and 9 are diagrams illustrating example processes associated with partial sounding for LOS MIMO multiplexing, in accordance with the present disclosure.

FIG. 8 is a diagram illustrating an example process 800 performed, for example, by a receiving device, in accordance with the present disclosure. Example process 800 is an example where the receiving device (e.g., receiving device 405) performs operations associated with partial sounding for line of sight multiple input multiple output multiplexing.

As shown in FIG. 8, in some aspects, process 800 may include transmitting, to a transmitting device, an LOS MIMO channel sounding configuration that indicates one or more channel sounding parameters for a partial sounding procedure associated with an LOS MIMO channel (block 810). For example, the receiving device (e.g., using communication manager 1008 and/or transmission component 1004, depicted in FIG. 10) may transmit, to a transmitting device, an LOS MIMO channel sounding configuration that indicates one or more channel sounding parameters for a partial sounding procedure associated with an LOS MIMO channel, as described above.

As further shown in FIG. 8, in some aspects, process 800 may include receiving, from the transmitting device, at least one SRS based at least in part on the one or more channel sounding parameters (block 820). For example, the receiving device (e.g., using communication manager 1008 and/or reception component 1002, depicted in FIG. 10) may receive, from the transmitting device, at least one SRS based at least in part on the one or more channel sounding parameters, as described above.

Process 800 may include additional aspects, such as any single aspect or any combination of aspects described below and/or in connection with one or more other processes described elsewhere herein.

In a first aspect, the one or more channel sound parameters indicate at least one of a subset of antennas of the transmitting device to be used for the partial sounding procedure, or a sounding bandwidth.

In a second aspect, alone or in combination with the first aspect, process 800 includes determining the sounding bandwidth based at least in part on at least one of an estimated LOS MIMO percentage corresponding to a communication channel, or a number of reception antennas of the receiving device.

In a third aspect, alone or in combination with one or more of the first and second aspects, process 800 includes selecting the partial sounding procedure based at least in part on at least one of an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

In a fourth aspect, alone or in combination with one or more of the first through third aspects, the LOS MIMO channel sounding configuration indicates an antenna configuration, the method further comprising determining the antenna configuration based at least in part on at least one of an LOS MIMO sounding capability of the transmitting device, an estimated LOS MIMO percentage corresponding to a communication channel, or an antenna array geometry of the transmitting device.

In a fifth aspect, alone or in combination with one or more of the first through fourth aspects, the antenna configuration indicates a number of sounding antennas, and wherein the antenna configuration identifies the sounding antennas.

In a sixth aspect, alone or in combination with one or more of the first through fifth aspects, the LOS MIMO channel sounding configuration comprises an SRS configuration.

In a seventh aspect, alone or in combination with one or more of the first through sixth aspects, the SRS configuration indicates one or more SRS resource sets, wherein each SRS resource set of the one or more SRS resource sets comprises a first parameter configuration corresponding to regular MIMO operation, and a second parameter configuration for LOS MIMO operation.

In an eighth aspect, alone or in combination with one or more of the first through seventh aspects, process 800 includes transmitting an LOS mode activation indication that indicates the first parameter configuration or the second parameter configuration.

In a ninth aspect, alone or in combination with one or more of the first through eighth aspects, the SRS configuration indicates an SRS resource set having an LOS MIMO parameter configuration for LOS MIMO operation.

In a tenth aspect, alone or in combination with one or more of the first through ninth aspects, process 800 includes transmitting an LOS mode activation indication associated with the LOS MIMO parameter configuration.

In an eleventh aspect, alone or in combination with one or more of the first through tenth aspects, process 800 includes receiving, from the transmitting device, antenna information, wherein the LOS MIMO channel sounding configuration is based at least in part on the antenna information.

In a twelfth aspect, alone or in combination with one or more of the first through eleventh aspects, the antenna information indicates at least one of a mapping between one or more antenna ports and one or more corresponding locations within an antenna array of the transmitting device, LOS MIMO capability information, LOS MIMO sounding capability information, alignment capability information, an antenna array geometry, a number of antennas, a number of antenna panels, an antenna element distance matrix, information, or UAI.

In a thirteenth aspect, alone or in combination with one or more of the first through twelfth aspects, the mapping comprises a bitmap. For example, the mapping may include a two-dimensional bitmap corresponding to each antenna to indicate its location in a two-dimensional array.

In a fourteenth aspect, alone or in combination with one or more of the first through thirteenth aspects, the UAI indicates at least one of a phase response associated with an antenna port, a phase difference between a first antenna port and a second antenna port, phasing coherence between the first antenna port and the post antenna port, or blockage information.

In a fifteenth aspect, alone or in combination with one or more of the first through fourteenth aspects, the LOS MIMO channel sounding configuration comprises a mapping between at least one sounding antenna index and at least one corner antenna.

In a sixteenth aspect, alone or in combination with one or more of the first through fifteenth aspects, the LOS MIMO channel sounding configuration indicates one or more SRS indices associated with the partial sounding procedure, and wherein a wireless communication standard indicates a mapping between the one or more SRS indices and one or more antennas corresponding to an antenna configuration of the transmitting device.

In a seventeenth aspect, alone or in combination with one or more of the first through sixteenth aspects, process 800 includes estimating the LOS MIMO channel based at least in part on applying an interpolation to the at least one SRS.

In an eighteenth aspect, alone or in combination with one or more of the first through seventeenth aspects, the interpolation comprises a linear interpolation over a plurality of channel estimates associated with the at least one SRS.

In a nineteenth aspect, alone or in combination with one or more of the first through eighteenth aspects, applying the interpolation comprises performing a phase ramp procedure to determine a phase interpolation.

In a twentieth aspect, alone or in combination with one or more of the first through nineteenth aspects, performing the phase ramp procedure comprises determining a phase difference between at least two antennas, wherein the LOS MIMO channel sounding configuration indicates the at least two antennas, and estimating at least one phase of at least one additional antenna based at least in part on at least one of the phase difference, a transmission antenna configuration, or a reception configuration.

In a twenty-first aspect, alone or in combination with one or more of the first through twentieth aspects, the at least two antennas comprise at least two corner antennas, and wherein estimating the at least one phase of the at least one additional antenna comprises determining a linear phase ramp associated with the at least two corner antennas.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
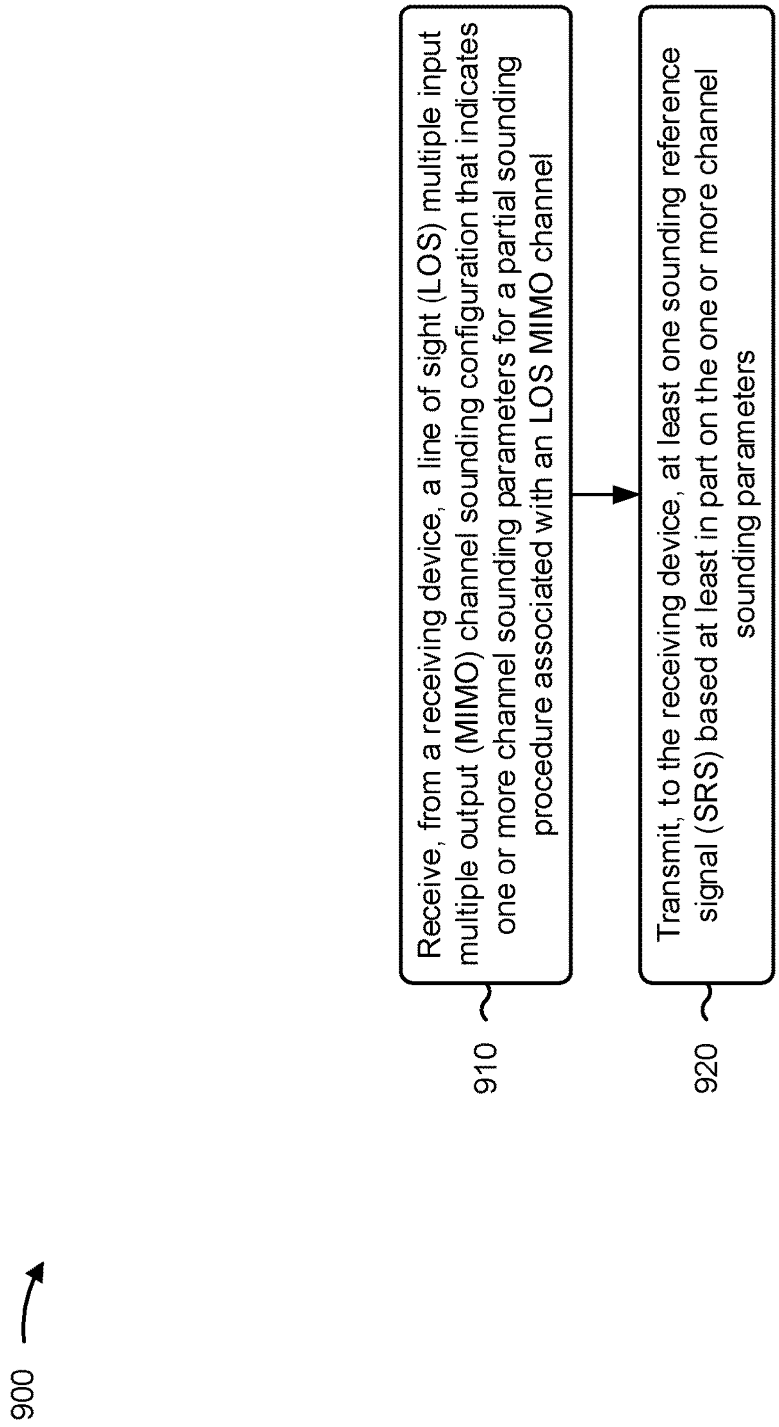

FIG. 9 is a diagram illustrating an example process 900 performed, for example, by a transmitting device, in accordance with the present disclosure. Example process 900 is an example where the transmitting device (e.g., transmitting device 410) performs operations associated with partial sounding for LOS MIMO multiplexing.

As shown in FIG. 9, in some aspects, process 900 may include receiving, from a receiving device, an LOS MIMO channel sounding configuration that indicates one or more channel sounding parameters for a partial sounding procedure associated with an LOS MIMO channel (block 910). For example, the transmitting device (e.g., using communication manager 1108 and/or reception component 1102, depicted in FIG. 11) may receive, from a receiving device, an LOS MIMO channel sounding configuration that indicates one or more channel sounding parameters for a partial sounding procedure associated with an LOS MIMO channel, as described above.

As further shown in FIG. 9, in some aspects, process 900 may include transmitting, to the receiving device, at least one SRS based at least in part on the one or more channel sounding parameters (block 920). For example, the transmitting device (e.g., using communication manager 1108 and/or transmission component 1104, depicted in FIG. 11) may transmit, to the receiving device, at least one SRS based at least in part on the one or more channel sounding parameters, as described above.

Process 900 may include additional aspects, such as any single aspect or any combination of aspects described below and/or in connection with one or more other processes described elsewhere herein.

In a first aspect, the one or more channel sound parameters indicate at least one of a subset of antennas of the transmitting device to be used for the partial sounding procedure, or a sounding bandwidth.

In a second aspect, alone or in combination with the first aspect, the sounding bandwidth is based at least in part on at least one of an estimated LOS MIMO percentage corresponding to a communication channel, or a number of reception antennas of the receiving device.

In a third aspect, alone or in combination with one or more of the first and second aspects, a selection of the partial sounding procedure based at least in part on at least one of an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

In a fourth aspect, alone or in combination with one or more of the first through third aspects, the LOS MIMO channel sounding configuration indicates an antenna configuration, wherein the antenna configuration is based at least in part on at least one of an LOS MIMO sounding capability of the transmitting device, an estimated LOS MIMO percentage corresponding to a communication channel, or an antenna array geometry of the transmitting device.

In a fifth aspect, alone or in combination with one or more of the first through fourth aspects, the antenna configuration indicates a number of sounding antennas, and wherein the antenna configuration identifies the sounding antennas.

In a sixth aspect, alone or in combination with one or more of the first through fifth aspects, the LOS MIMO channel sounding configuration comprises an SRS configuration.

In a seventh aspect, alone or in combination with one or more of the first through sixth aspects, the SRS configuration indicates one or more SRS resource sets, wherein each SRS resource set of the one or more SRS resource sets comprises a first parameter configuration corresponding to regular MIMO operation, and a second parameter configuration for LOS MIMO operation.

In an eighth aspect, alone or in combination with one or more of the first through seventh aspects, process 900 includes receiving an LOS mode activation indication that indicates the first parameter configuration or the second parameter configuration.

In a ninth aspect, alone or in combination with one or more of the first through eighth aspects, the SRS configuration indicates an SRS resource set having an LOS MIMO parameter configuration for LOS MIMO operation.

In a tenth aspect, alone or in combination with one or more of the first through ninth aspects, process 900 includes receiving an LOS mode activation indication associated with the LOS MIMO parameter configuration.

In an eleventh aspect, alone or in combination with one or more of the first through tenth aspects, process 900 includes transmitting, to the receiving device, antenna information, wherein the LOS MIMO channel sounding configuration is based at least in part on the antenna information.

In a twelfth aspect, alone or in combination with one or more of the first through eleventh aspects, the antenna information indicates at least one of a mapping between one or more antenna ports and one or more corresponding locations within an antenna array of the transmitting device, LOS MIMO capability information, LOS MIMO sounding capability information, alignment capability information, an antenna array geometry, a number of antennas, a number of antenna panels, an antenna element distance matrix, information, or UAI.

In a thirteenth aspect, alone or in combination with one or more of the first through twelfth aspects, the mapping comprises a bitmap.

In a fourteenth aspect, alone or in combination with one or more of the first through thirteenth aspects, the UAI indicates at least one of a phase response associated with an antenna port, a phase difference between a first antenna port and a second antenna port, phasing coherence between the first antenna port and the post antenna port, or blockage information.

In a fifteenth aspect, alone or in combination with one or more of the first through fourteenth aspects, the LOS MIMO channel sounding configuration comprises a mapping between at least one sounding antenna index and at least one corner antenna.

In a sixteenth aspect, alone or in combination with one or more of the first through fifteenth aspects, the LOS MIMO channel sounding configuration indicates one or more SRS indices associated with the partial sounding procedure, and wherein a wireless communication standard indicates a mapping between the one or more SRS indices and one or more antennas corresponding to an antenna configuration of the transmitting device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
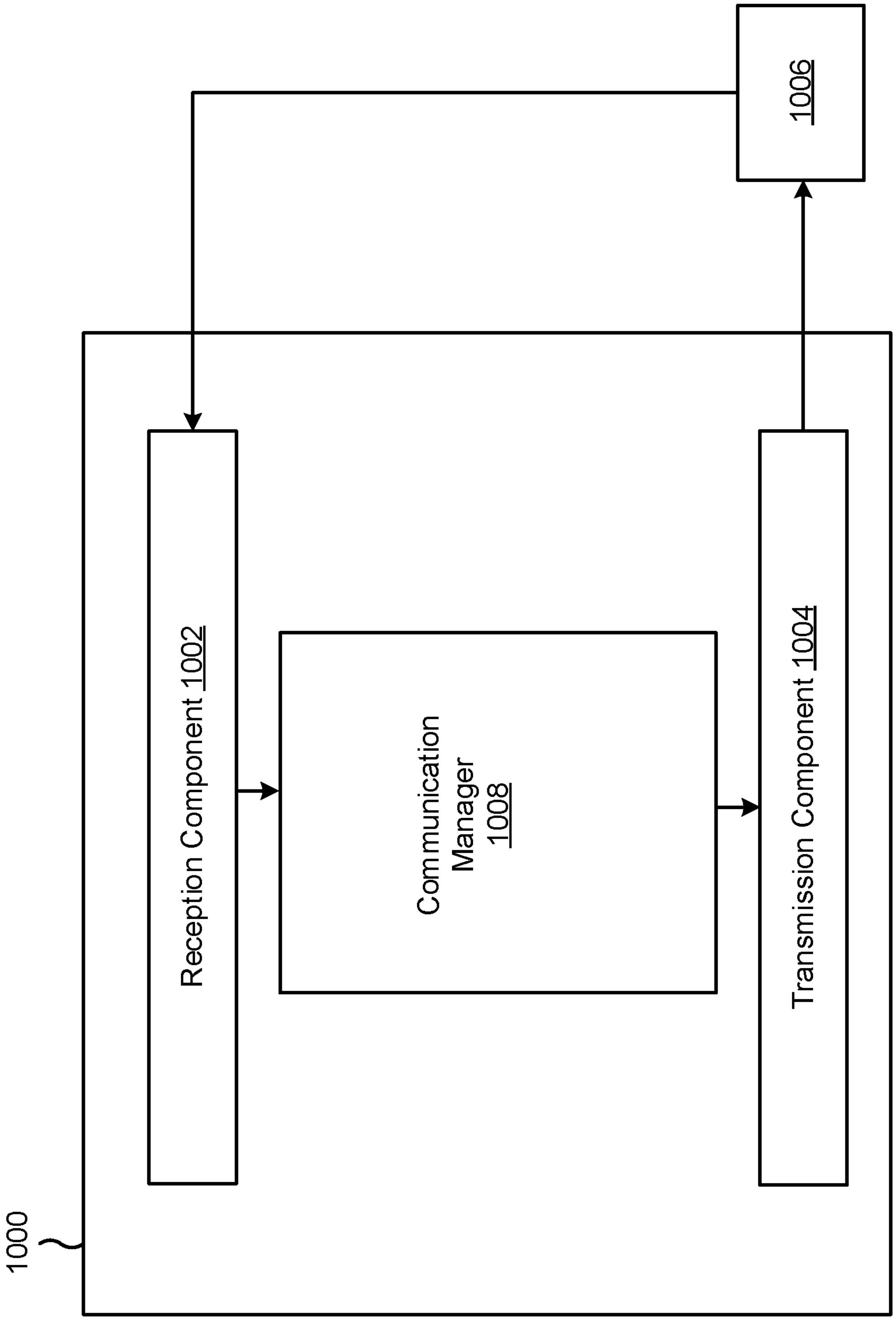
FIGS. 10 and 11 are block diagrams of example apparatuses for wireless communication, in accordance with the present disclosure.

FIG. 10 is a block diagram of an example apparatus 1000 for wireless communication. The apparatus 1000 may be a receiving device, or a receiving device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008.

In some aspects, the apparatus 1000 may be configured to perform one or more operations described herein in connection with FIGS. 4, 5A, 5B, 6A, and 6B. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the receiving device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the receiving device described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the receiving device described in connection with FIG. 2. In some aspects, the transmission component 1004 may be co-located with the reception component 1002 in a transceiver.

The transmission component 1004 may transmit, to a transmitting device, an LOS MIMO channel sounding configuration that indicates one or more channel sounding parameters for a partial sounding procedure associated with an LOS MIMO channel. The reception component 1002 may receive, from the transmitting device, at least one SRS based at least in part on the one or more channel sounding parameters.

The communication manager 1008 may determine the sounding bandwidth based at least in part on at least one of an estimated LOS MIMO percentage corresponding to a communication channel, or a number of reception antennas of the receiving device. In some aspects, the communication manager 1008 may include one or more antennas, a modulator, a transmit MIMO processor, a transmit processor, a controller/processor, a memory, or a combination thereof, of the receiving device described in connection with FIG. 2. In some aspects, the communication manager 1008 may include the reception component 1002 and/or the transmission component 1004.

The communication manager 1008 may select the partial sounding procedure based at least in part on at least one of an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

The transmission component 1004 may transmit an LOS mode activation indication that indicates the first parameter configuration or the second parameter configuration.

The transmission component 1004 may transmit an LOS mode activation indication associated with the LOS MIMO parameter configuration.

The reception component 1002 may receive, from the transmitting device, antenna information wherein the LOS MIMO channel sounding configuration is based at least in part on the antenna information.

The communication manager 1008 may estimate the LOS MIMO channel based at least in part on applying an interpolation to the at least one SRS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
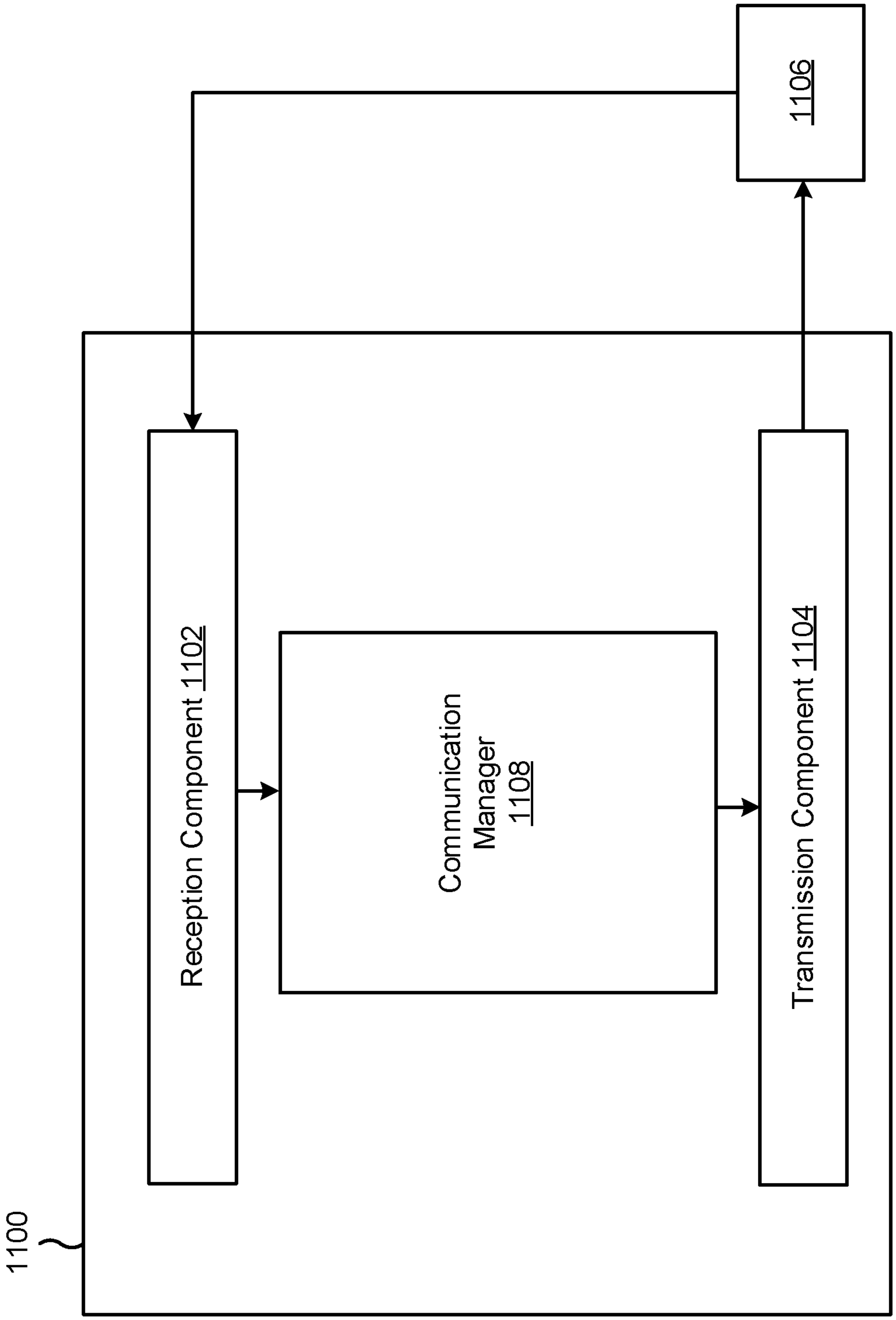

FIG. 11 is a block diagram of an example apparatus 1100 for wireless communication. The apparatus 1100 may be a transmitting device, or a transmitting device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108.

In some aspects, the apparatus 1100 may be configured to perform one or more operations described herein in connection with FIGS. 4, 5A, 5B, 6A, and 6B. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the transmitting device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the transmitting device described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the transmitting device described in connection with FIG. 2. In some aspects, the transmission component 1104 may be co-located with the reception component 1102 in a transceiver.

The reception component 1102 may receive, from a receiving device, an LOS MIMO channel sounding configuration that indicates one or more channel sounding parameters for a partial sounding procedure associated with an LOS MIMO channel. The transmission component 1104 may transmit, to the receiving device, at least one SRS based at least in part on the one or more channel sounding parameters.

The reception component 1102 may receive an LOS mode activation indication that indicates the first parameter configuration or the second parameter configuration. The reception component 1102 may receive an LOS mode activation indication associated with the LOS MIMO parameter configuration. The transmission component 1104 may transmit, to the receiving device, antenna information wherein the LOS MIMO channel sounding configuration is based at least in part on the antenna information.

The communication manager 1108 may manage one or more of the operations of the reception component 1102 and/or the transmission component 1104. In some aspects, the communication manager 1108 may include one or more antennas, a modulator, a transmit MIMO processor, a transmit processor, a controller/processor, a memory, or a combination thereof, of the transmitting device described in connection with FIG. 2. In some aspects, the communication manager 1108 may include the reception component 1102 and/or the transmission component 1104.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a receiving device, comprising: transmitting, to a transmitting device, a line of sight (LOS) multiple input multiple output (MIMO) channel sounding configuration that indicates one or more channel sounding parameters for a partial sounding procedure associated with an LOS MIMO channel; and receiving, from the transmitting device, at least one sounding reference signal (SRS) based at least in part on the one or more channel sounding parameters.

Aspect 2: The method of Aspect 1, wherein the one or more channel sound parameters indicate at least one of: a subset of antennas of the transmitting device to be used for the partial sounding procedure, or a sounding bandwidth.

Aspect 3: The method of Aspect 2, further comprising determining the sounding bandwidth based at least in part on at least one of: an estimated LOS MIMO percentage corresponding to a communication channel, or a number of reception antennas of the receiving device.

Aspect 4: The method of any of Aspects 1-3, further comprising selecting the partial sounding procedure based at least in part on at least one of: an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

Aspect 5: The method of any of Aspects 1-4, wherein the LOS MIMO channel sounding configuration indicates an antenna configuration, the method further comprising determining the antenna configuration based at least in part on at least one of: an LOS MIMO sounding capability of the transmitting device, an estimated LOS MIMO percentage corresponding to a communication channel, or an antenna array geometry of the transmitting device.

Aspect 6: The method of Aspect 5, wherein the antenna configuration indicates a number of sounding antennas, and wherein the antenna configuration identifies the sounding antennas.

Aspect 7: The method of any of Aspects 1-6, wherein the LOS MIMO channel sounding configuration comprises an SRS configuration.

Aspect 8: The method of Aspect 7, wherein the SRS configuration indicates one or more SRS resource sets, wherein each SRS resource set of the one or more SRS resource sets comprises: a first parameter configuration corresponding to regular MIMO operation, and a second parameter configuration for LOS MIMO operation.

Aspect 9: The method of Aspect 8, further comprising transmitting an LOS mode activation indication that indicates the first parameter configuration or the second parameter configuration.

Aspect 10: The method of any of Aspects 7-9, wherein the SRS configuration indicates an SRS resource set having an LOS MIMO parameter configuration for LOS MIMO operation.

Aspect 11: The method of Aspect 10, further comprising transmitting an LOS mode activation indication associated with the LOS MIMO parameter configuration.

Aspect 12: The method of any of Aspects 1-11, further comprising receiving, from the transmitting device, antenna information, wherein the LOS MIMO channel sounding configuration is based at least in part on the antenna information.

Aspect 13: The method of Aspect 12, wherein the antenna information indicates at least one of: a mapping between one or more antenna ports and one or more corresponding locations within an antenna array of the transmitting device, LOS MIMO capability information, LOS MIMO sounding capability information, alignment capability information, an antenna array geometry, a number of antennas, a number of antenna panels, an antenna element distance matrix, polarization information, or user equipment-assisted information (UAI).

Aspect 14: The method of Aspect 13, wherein the mapping comprises a bitmap.

Aspect 15: The method of either of Aspects 13 or 14, wherein the UAI indicates at least one of: a phase response associated with an antenna port, a phase difference between a first antenna port and a second antenna port, phase coherence between the first antenna port and the post antenna port, or antenna blockage information.

Aspect 16: The method of any of Aspects 1-15, wherein the LOS MIMO channel sounding configuration comprises a mapping between at least one sounding antenna index and at least one corner antenna.

Aspect 17: The method of any of Aspects 1-16, wherein the LOS MIMO channel sounding configuration indicates one or more SRS indices associated with the partial sounding procedure, and wherein a wireless communication standard indicates a mapping between the one or more SRS indices and one or more antennas corresponding to an antenna configuration of the transmitting device.

Aspect 18: The method of any of Aspects 1-17, further comprising estimating the LOS MIMO channel based at least in part on applying an interpolation to the at least one SRS.

Aspect 19: The method of Aspect 18, wherein the interpolation comprises a linear interpolation over a plurality of channel estimates associated with the at least one SRS.

Aspect 20: The method of either of Aspects 18 or 19, wherein applying the interpolation comprises performing a phase ramp procedure to determine a phase interpolation.

Aspect 21: The method of Aspect 20, wherein performing the phase ramp procedure comprises: determining a phase difference between at least two antennas, wherein the LOS MIMO channel sounding configuration indicates the at least two antennas; and estimating at least one phase of at least one additional antenna based at least in part on at least one of: the phase difference, a transmission antenna configuration, or a reception configuration.

Aspect 22: The method of Aspect 21, wherein the at least two antennas comprise at least two corner antennas, and wherein estimating the at least one phase of the at least one additional antenna comprises determining a linear phase ramp associated with the at least two corner antennas.

Aspect 23: A method of wireless communication performed by a transmitting device, comprising: receiving, from a receiving device, a line of sight (LOS) multiple input multiple output (MIMO) channel sounding configuration that indicates one or more channel sounding parameters for a partial sounding procedure associated with an LOS MIMO channel; and transmitting, to the receiving device, at least one sounding reference signal (SRS) based at least in part on the one or more channel sounding parameters.

Aspect 24: The method of Aspect 23, wherein the one or more channel sound parameters indicate at least one of: a subset of antennas of the transmitting device to be used for the partial sounding procedure, or a sounding bandwidth.

Aspect 25: The method of Aspect 24, wherein the sounding bandwidth is based at least in part on at least one of: an estimated LOS MIMO percentage corresponding to a communication channel, or a number of reception antennas of the receiving device.

Aspect 26: The method of any of Aspects 23-25, wherein a selection of the partial sounding procedure based at least in part on at least one of: an estimated LOS MIMO percentage corresponding to a communication channel, a transmission antenna array configuration, a reception antenna array configuration, an alignment between a transmission array and a reception array, a misalignment compensation, a communication scenario type, or an LOS MIMO sounding capability of the transmitting device.

Aspect 27: The method of any of Aspects 23-26, wherein the LOS MIMO channel sounding configuration indicates an antenna configuration, wherein the antenna configuration is based at least in part on at least one of: an LOS MIMO sounding capability of the transmitting device, an estimated LOS MIMO percentage corresponding to a communication channel, or an antenna array geometry of the transmitting device.

Aspect 28: The method of Aspect 27, wherein the antenna configuration indicates a number of sounding antennas, and wherein the antenna configuration identifies the sounding antennas.

Aspect 29: The method of any of Aspects 23-28, wherein the LOS MIMO channel sounding configuration comprises an SRS configuration.

Aspect 30: The method of Aspect 29, wherein the SRS configuration indicates one or more SRS resource sets, wherein each SRS resource set of the one or more SRS resource sets comprises: a first parameter configuration corresponding to regular MIMO operation, and a second parameter configuration for LOS MIMO operation.

Aspect 31: The method of Aspect 30, further comprising receiving an LOS mode activation indication that indicates the first parameter configuration or the second parameter configuration.

Aspect 32: The method of any of Aspects 29-31, wherein the SRS configuration indicates an SRS resource set having an LOS MIMO parameter configuration for LOS MIMO operation.

Aspect 33: The method of Aspect 32, further comprising receiving an LOS mode activation indication associated with the LOS MIMO parameter configuration.

Aspect 34: The method of any of Aspects 23-33, further comprising transmitting, to the receiving device, antenna information, wherein the LOS MIMO channel sounding configuration is based at least in part on the antenna information.

Aspect 35: The method of Aspect 34, wherein the antenna information indicates at least one of: a mapping between one or more antenna ports and one or more corresponding locations within an antenna array of the transmitting device, LOS MIMO capability information, LOS MIMO sounding capability information, alignment capability information, an antenna array geometry, a number of antennas, a number of antenna panels, an antenna element distance matrix, polarization information, or user equipment-assisted information (UAI).

Aspect 36: The method of Aspect 35, wherein the mapping comprises a bitmap.

Aspect 37: The method of either of Aspects 35 or 36, wherein the UAI indicates at least one of: a phase response associated with an antenna port, a phase difference between a first antenna port and a second antenna port, phase coherence between the first antenna port and the post antenna port, or antenna blockage information.

Aspect 38: The method of any of Aspects 23-37, wherein the LOS MIMO channel sounding configuration comprises a mapping between at least one sounding antenna index and at least one corner antenna.

Aspect 39: The method of any of Aspects 23-38, wherein the LOS MIMO channel sounding configuration indicates one or more SRS indices associated with the partial sounding procedure, and wherein a wireless communication standard indicates a mapping between the one or more SRS indices and one or more antennas corresponding to an antenna configuration of the transmitting device.

Aspect 40: An apparatus for wireless communication at a device, comprising a processor; memory coupled with the processor; and instructions stored in the memory and executable by the processor to cause the apparatus to perform the method of one or more of Aspects 1-22.

Aspect 41: A device for wireless communication, comprising a memory and one or more processors coupled to the memory, the one or more processors configured to perform the method of one or more of Aspects 1-22.

Aspect 42: An apparatus for wireless communication, comprising at least one means for performing the method of one or more of Aspects 1-22.

Aspect 43: A non-transitory computer-readable medium storing code for wireless communication, the code comprising instructions executable by a processor to perform the method of one or more of Aspects 1-22.

Aspect 43: A non-transitory computer-readable medium storing a set of instructions for wireless communication, the set of instructions comprising one or more instructions that, when executed by one or more processors of a device, cause the device to perform the method of one or more of Aspects 1-22.

Aspect 44: An apparatus for wireless communication at a device, comprising a processor; memory coupled with the processor; and instructions stored in the memory and executable by the processor to cause the apparatus to perform the method of one or more of Aspects 23-39.

Aspect 45: A device for wireless communication, comprising a memory and one or more processors coupled to the memory, the one or more processors configured to perform the method of one or more of Aspects 23-39.

Aspect 46: An apparatus for wireless communication, comprising at least one means for performing the method of one or more of Aspects 23-39.

Aspect 47: A non-transitory computer-readable medium storing code for wireless communication, the code comprising instructions executable by a processor to perform the method of one or more of Aspects 23-39.

Aspect 48: A non-transitory computer-readable medium storing a set of instructions for wireless communication, the set of instructions comprising one or more instructions that, when executed by one or more processors of a device, cause the device to perform the method of one or more of Aspects 23-39.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
a memory; and
one or more processors, coupled to the memory, configured to:
transmit, to a second device, a line of sight (LOS) multiple input multiple output (MIMO) channel sounding configuration that indicates one or more channel sounding parameters for a partial sounding procedure associated with an LOS MIMO channel, wherein the one or more channel sound parameters indicate a sounding bandwidth, wherein the sounding bandwidth is based at least in part on an estimated LOS MIMO percentage corresponding to a communication channel; and
receive, from the second device, at least one sounding reference signal (SRS) based at least in part on the one or more channel sounding parameters.

2. The first device of claim 1, wherein the LOS MIMO channel sounding configuration indicates an antenna configuration that indicates a number of sounding antennas, wherein the antenna configuration identifies the sounding antennas, and wherein the one or more processors are configured to determine the antenna configuration based at least in part on at least one of:
the estimated LOS MIMO percentage corresponding to the communication channel, or
an antenna array geometry of the second device.

3. A first device for wireless communication, comprising:
a memory; and
one or more processors, coupled to the memory, configured to:
transmit, to a second device, a line of sight (LOS) multiple input multiple output (MIMO) channel sounding configuration that indicates one or more channel sounding parameters for a partial sounding procedure associated with an LOS MIMO channel;
select the partial sounding procedure based at least in part on at least one of: an estimated LOS MIMO percentage corresponding to a communication channel, a transmission antenna array configuration, a reception antenna array configuration, an alignment between a transmission array and a reception array, a misalignment compensation, or a communication scenario type; and
receive, from the second device, at least one sounding reference signal (SRS) based at least in part on the one or more channel sounding parameters.

4. The first device of claim 3, wherein, the one or more processors, to select the partial sounding procedure, are configured to select the partial sounding procedure based at least in part on the estimated LOS MIMO percentage corresponding to the communication channel.

5. The first device of claim 3, wherein, the one or more processors, to select the partial sounding procedure, are configured to select the partial sounding procedure based at least in part on the transmission antenna array configuration.

6. The first device of claim 3, wherein, the one or more processors, to select the partial sounding procedure, are configured to select the partial sounding procedure based at least in part on the reception antenna array configuration.

7. The first device of claim 3, wherein, the one or more processors, to select the partial sounding procedure, are configured to select the partial sounding procedure based at least in part on the alignment between the transmission array and the reception array.

8. The first device of claim 3, wherein, the one or more processors, to select the partial sounding procedure, are configured to select the partial sounding procedure based at least in part on the misalignment compensation.

9. The first device of claim 3, wherein, the one or more processors, to select the partial sounding procedure, are configured to select the partial sounding procedure based at least in part on the communication scenario type.

10. A first device for wireless communication, comprising:
a memory; and
one or more processors, coupled to the memory, configured to:
transmit, to a second device, a line of sight (LOS) multiple input multiple output (MIMO) channel sounding configuration that indicates one or more channel sounding parameters for a partial sounding procedure associated with an LOS MIMO channel; and
receive, from the second device, at least one sounding reference signal (SRS) based at least in part on the one or more channel sounding parameters, wherein the LOS MIMO channel sounding configuration comprises an SRS configuration that indicates one or more SRS resource sets, wherein each SRS resource set of the one or more SRS resource sets comprises:

a first parameter configuration corresponding to regular MIMO operation, and
a second parameter configuration for LOS MIMO operation.

11. The first device of claim 10, wherein the one or more processors are further configured to transmit an LOS mode activation indication that indicates the first parameter configuration or the second parameter configuration.

12. The first device of claim 10, wherein the SRS configuration indicates an SRS resource set having an LOS MIMO parameter configuration for LOS MIMO operation.

13. The first device of claim 12, wherein the one or more processors are further configured to transmit an LOS mode activation indication associated with the LOS MIMO parameter configuration.

14. The first device of claim 10,
wherein the one or more processors are further configured to receive, from the second device, antenna information,
wherein the LOS MIMO channel sounding configuration is based at least in part on the antenna information.

15. The first device of claim 14, wherein the antenna information indicates at least one of:
a mapping between one or more antenna ports and one or more corresponding locations within an antenna array of the second device,
alignment capability information,
an antenna element distance matrix, or
user equipment-assisted information (UAI), wherein the UAI indicates at least one of:
a phase difference between a first antenna port and a second antenna port, phase coherence between the first antenna port and the second antenna port, or antenna blockage information.

16. The first device of claim 15, wherein the mapping comprises a bitmap.

17. The first device of claim 14, wherein the antenna information indicates the mapping between one or more antenna ports and one or more corresponding locations within the antenna array of the second device.

18. The first device of claim 14, wherein the antenna information indicates the alignment capability information.

19. The first device of claim 14, wherein the antenna information indicates the antenna element distance matrix.

20. The first device of claim 14, wherein the antenna information indicates the UAI, wherein the UAI indicates the phase difference between the first antenna port and the second antenna port.

21. The first device of claim 14, wherein the antenna information indicates the UAI, wherein the UAI indicates the phase coherence between the first antenna port and the second antenna port.

22. The first device of claim 14, wherein the antenna information indicates the UAI, wherein the UAI indicates the antenna blockage information.

23. The first device of claim 10, wherein the LOS MIMO channel sounding configuration comprises a mapping between at least one sounding antenna index and at least one corner antenna.

24. The first device of claim 10, wherein the LOS MIMO channel sounding configuration indicates one or more SRS indices associated with the partial sounding procedure.

25. The first device of claim 10, wherein the one or more processors are further configured to estimate the LOS MIMO channel based at least in part on application of an interpolation to the at least one SRS.

26. The first device of claim 25, wherein the interpolation comprises a linear interpolation over a plurality of channel estimates associated with the at least one SRS.

27. The first device of claim 25, wherein the one or more processors, to apply the interpolation, are configured to perform a phase ramp procedure to determine a phase interpolation.

28. The first device of claim 27, wherein the one or more processors, to perform the phase ramp procedure, are configured to:
determine a phase difference between at least two antennas, wherein the LOS MIMO channel sounding configuration indicates the at least two antennas; and
estimate at least one phase of at least one additional antenna based at least in part on at least one of:
the phase difference,
a transmission antenna configuration, or
a reception configuration.

29. The first device of claim 28, wherein the at least two antennas comprise at least two corner antennas, and wherein estimating the at least one phase of the at least one additional antenna comprises determining a linear phase ramp associated with the at least two corner antennas.

30. A first device for wireless communication, comprising:
a memory; and
one or more processors, coupled to the memory, configured to:
receive, from a second device, a line of sight (LOS) multiple input multiple output (MIMO) channel sounding configuration that indicates one or more channel sounding parameters for a partial sounding procedure associated with an LOS MIMO channel; and
transmit, to the second device, at least one sounding reference signal (SRS) based at least in part on the one or more channel sounding parameters, wherein the LOS MIMO channel sounding configuration comprises an SRS configuration that indicates one or more SRS resource sets, wherein each SRS resource set of the one or more SRS resource sets comprises:
a first parameter configuration corresponding to regular MIMO operation, and
a second parameter configuration for LOS MIMO operation.

31. The first device of claim 30, wherein the LOS MIMO channel sounding configuration indicates an antenna configuration that indicates a number of sounding antennas, wherein the antenna configuration identifies the sounding antennas, and wherein the antenna configuration is based at least in part on at least one of:
an LOS MIMO sounding capability of the first device,
an estimated LOS MIMO percentage corresponding to a communication channel, or
an antenna array geometry of the first device.

32. The first device of claim 30, wherein the one or more processors are further configured to receive an LOS mode activation indication that indicates the first parameter configuration or the second parameter configuration.

* * * * *